United States Patent Office

3,362,828
Patented Jan. 9, 1968

3,362,828
SWINE FEEDS CONTAINING MONOSODIUM GLUTAMATE
George W. Thrasher, 133 Woodbine Drive, Terre Haute, Ind. 47803, and William M. Beeson, 1510 N. Grant St., West Lafayette, Ind. 47906
No Drawing. Filed Oct. 26, 1962, Ser. No. 233,453
6 Claims. (Cl. 99—2)

This application is a continuation-in-part of a patent application Ser. No. 157,846, filed Dec. 7, 1961.

Our invention relates to swine feeds and to baby pig creep feeds, and more particularly it relates to swine feeds and baby pig creep feeds containing small but effective amounts of a salt of glutamic acid.

One important trend in modern swine production is toward a more rapid development of market-weight swine. Not only is the size of the mature pig a factor, but of tremendous importance is the amount of time in which equipment, space and feed are occupied in growing the pig to a marketable size.

Growing swine to market weight on less consumed feed is another important trend in swine production. This is commonly referred to a feed efficiency or feed conversion from feed to liveweight of swine. An increase in feed efficiency results in less cost in producing market-weight swine.

Another important economic factor in raising swine is early weaning of baby pigs. Early weaning enables a produced to rebreed the sow sooner after farrowing. This in turn results in a higher production rate of swine for the same fixed investment. Early weaning with proper swine raising procedures will also increase the rate of growth and development of the baby pig. The sow's milk output reaches a maximum flow three to four weeks after farowing whereas the baby pig's food requirements continue to rise. To maintain the early growth rate when the sow's milk supply levels off, a substitute food that is highly acceptable to the baby pig must be supplied by the producer to provide the means for continued growth. Such a substitute food is given to a baby pig as soon as practical after birth and usually several weeks or more prior to weaning in order that the baby pig acquire a taste for the solid food. Once the pig fully accepts the solid food, it may be weaned. The producer will continue to feed the creep ration after weaning until such time that the young pig will accept a normal adult hog feed.

Baby pig creep feeds must be highly desirable in order to insure early acceptance by the pigs. To gain a high degree of desirability, feed manufacturers have included in their baby pig starters upwards to 20% sugar. This results in a relatively expensive feed. However, swine producers in general consider the greater cost as secondary to an early acceptance of the dry feed.

We have now discovered that the inclusion of small amount of a salt of glutamic acid in baby pig starter feed improves the desirability of the feed. The preferability of salt of glutamic acid containing feed markedly increases the degree of acceptance of the feed by baby pigs. Creep feeds both with and without sugar are found to be more preferable and acceptable to the baby pigs by the addition of small amounts of a glutamic acid salt than the same feed without the such salt. For instance, the creep feeds can contain from about 0 or 0.1 to about 25% or more by weight of sugar. We have also found that small amounts of a salt of glutamic acid can be substituted for a large part of the expensive sugar used in the baby pig starters and still retain an equally high degree of acceptance, thus providing a significant improvement to the acceptance efficiency of the creep feed. Moreover, as heat is employed in the preparation of baby creep feeds, the sugar can undesirably caramelize; accordingly, it is also desirable to substitute the salt for sugar to avoid producing creep feeds containing undesirable quantities of caramelized sugar which is undesirable to the baby pigs.

We have found that a highly preferable and well-accepted baby pig creep feed is produced when a salt of glutamic acid, for instance a metal salt such as monosodium glutamate, is added to a nutrient feed ration in preferability improving amounts, generally from about 0.01% to about 5.0% by weight of the total ration. However, we prefer to add the salt as monosodium glutamate in amounts from about 0.1 to about 1.0 weight percent. Thus, per ton of fed, we prefer to add from about 2 pounds to about 20 pounds of monosodium glutamate. Other salts of glutamic acid which may be used in accordance with the present invention include the magnesium, iron, calcium, zinc, ammonium, potassium, cobalt and lithium salts; however, the sodium salt is preferred.

We have also discovered that adult swine fed small amounts of monosodium glutamate not only eat greater quantities of feed but also demonstrate an improved feed conversion and an increased rate of weight gain. Generally we have found that swine feeds containing from about 0.01 to about 5% by weight of monosodium glutamate, based on the weight of the feed, produce the desired results. However, optimum results are obtained when from about 0.05 to about 1% by weight of monosodium glutamate is utilized. Thus, we generally employ from about 0.2 to about 100 pounds of monosodium glutamate per ton of adult pig feed.

Our additives can be added to the feeds in any convenient manner. We have found it convenient to first premix our additives with a small amount of corn or soybean meal before incorporating it into the rest of the feeds. We have also found it convenient to pelletize our feed ration into 5/32 or 3/16-inch pellets. However, these steps are not necessary to the invention. We have noted in the course of our experiments that the material is easily handled and readily forms pellets when incorporated in a mixed feed.

We offer the following examples to further illustrate the invention. It is not intended that this invention be limited to the procedures, amounts of active ingredients, or described rations in these examples; but rather it is intended that all equivalents obvious to those skilled in the art be included within the scope of our invention.

*Example I*

A basic swine feed ration was prepared containing essentially the following:

| | Pounds |
|---|---|
| Ground yellow corn | 55.75 |
| Soybean meal, 50% | 21.00 |
| Fish solubles, liquid | 2.50 |
| Dried whey | 15.00 |
| Lard | 2.50 |
| Limestone | 0.70 |
| Dicalcium phosphate | 0.95 |
| Iodized salt | 0.50 |
| Vitamin and mineral premix | 1.12 |

To a portion of feed of this composition we added monosodium glutamate so that the final ration contained 1% by weight of the monosodium glutamate. This ration was then pelletized into 3/16-inch pellets. A second portion of the feed, that contained no monosodium glutamate was likewise pelletized into 3/16-inch pellets.

The two feeds in separate feeders were placed in a pen. The feeders were located an equal distance from the water source and the heat lamp. The feeders were replaced with clean feeders and their position switched three times a week to avoid any influence of odor or location on the test results. A litter of ten 21-day old pigs was placed in the pen. The sow was placed in an adjoining pen with a fence that allowed the baby pigs free access to both pens but prevented the sow from entering the test area. The baby pigs were weaned at 42 days of age. The test continued until the pigs were 56 days of age.

At the end of the test the total weight of rations consumed was determined. We found that the pigs had consumed only 21.8 pounds of the basic ration to 237.6 pounds of the ration containing monosodium glutamate, a preference of in excess of 10 to 1 for the feed containing the additive.

*Example II*

The basic ration of Example I was modified to include 15% by weight cane sugar. The procedure of Example I was followed. To one portion of this modified ration, 1.0% by weight monosodium glutamate was added. Six 21-day old pigs were then supplied with these rations for a test period of 35 days. The feed consumption was found to be 48.4 pounds of the modified basic ration to 196.6 pounds of the ration containing monosodium glutamate, a preference of in excess of 4 to 1 for the feed containing the additive.

*Example III*

The procedure of Example I was used with the feed basic ration being composed of the following:

Ingredient: Percent
- Rolled oats _____ 35.0
- Ground yellow corn _____ 22.2
- Soybean meal (50%) _____ 20.0
- Dried whey _____ 15.0
- Dried skim milk _____ 5.0
- Dicalcium phosphate _____ 1.0
- Ground limestone _____ 1.0
- Trace mineralized salt _____ 0.5
- Vitamin mix _____ 0.2
- Antibiotic supplement _____ 0.1

To one portion of the feed 0.5% by weight monosodium glutamate was added. The test started with five 21-day old pigs and ran for a total of 21 days. The consumption of feed was determined at the end of the test and we found that 21 pounds of the basic ration had been consumed to 124 pounds of the ration containing monosodium glutamate, a preference of 6 to 1 for the feed containing the additive.

*Example IV*

The basic ration of Example I was modified by the addition of 10% by weight of cane sugar. The procedure of Example I was followed. To one portion of this modified ration 0.1% by weight monosodium glutamate was added. A litter of ten 14-day old pigs was started on this ration and the test terminated after 28 days. At the end of the test the ration consumption was determined and we found that 36.5 pounds of the modified basic ration was consumed to 164.7 pounds of the ration containing monosodium glutamate, a preference of in excess of 4 to 1 for the feed containing monosodium glutamate.

*Example V*

The procedure of Example I was followed. To a portion of the basic feed ration in Example I, 15% by weight cane sugar (sucrose) was added. To a second portion of the basic ration used in Example I, 5% by weight cane sugar and 1.0% by weight monosodium glutamate was added. This ration was fed to a litter of six pigs for a period of 35 days. At the termination of the test, the consumption of ration was determined and we found that 130.5 pounds of the ration containing sugar only was consumed to 160.0 pounds of the ration containing 5% sugar and monosodium glutamate.

*Example VI*

Three baby pig starter rations were prepared containing the following ingredients:

| Ingredient | No MSG | 0.5% MSG | 1.0% MSG |
|---|---|---|---|
| Ground Corn | 20.75 | 20.25 | 19.75 |
| Ground Wheat | 20.00 | 20.00 | 20.00 |
| Rolled Oats | 20.00 | 20.00 | 20.00 |
| Sodium Glutamate | | 0.50 | 1.00 |
| Soybean Oil Meal | 15.00 | 15.00 | 15.00 |
| Fish Meal | 5.00 | 5.00 | 5.00 |
| Skimmed Milk Dried | 10.00 | 10.00 | 10.00 |
| Fish Solubles | 3.00 | 3.00 | 3.00 |
| Alfalfa Meal | 2.00 | 2.00 | 2.00 |
| Antibiotic-B$_{12}$ | 1.30 | 1.30 | 1.30 |
| Vitamin A and D Feeding Oil | 0.75 | 0.75 | 0.75 |
| B-Vitamin Supplement | 0.20 | 0.20 | 0.20 |
| Salt | 0.50 | 0.50 | 0.50 |
| Limestone | 0.50 | 0.50 | 0.50 |
| Bone Meal | 1.00 | 1.00 | 1.00 |
| | 100.00 | 100.00 | 100.00 |

The three feeds in separate feeders were placed in a pen. A litter of twelve, three-week old pigs was placed in the pen. The test continued for a period of five weeks.

At the end of the test the total weight of rations consumed was determined. We found that the pigs had consumed 51.5 pounds of the ration containing no monosodium glutamate, 89.5 pounds of the ration containing 0.5% monosodium glutamate, and 316.0 pounds of the ration containing 1.0% monosodium glutamate, indicating a substantial preference for the rations containing monosodium glutamate.

*Example VII*

Two separate groups of weanling pigs, each averaging approximately 50 pounds live weight, were divided equally into three replicates per group according to live weight, sex, and litter. One group consisted of 15 Hampshire pigs and the other consisted of 21 Duroc pigs. The basic feed employed had the following composition:

| | | |
|---|---|---|
| Ground yellow corn | pounds | 1,502.0 |
| Meat and bone scraps | do | 50.0 |
| Soybean oil meal | do | 350.0 |
| Dehydrated alfalfa meal | do | 50.0 |
| Limestone | do | 10.0 |
| Dicalcium phosphate | do | 20.0 |
| Salt (iodized) | do | 10.0 |
| CCC trace mineral [1] | do | 1.0 |
| BY-21 [2] | do | 0.5 |
| Choline chloride (25%) | do | 2.0 |
| PROFERM 6 [3] | do | 2.5 |
| BACIFERM PB 10 [4] | do | 2.0 |
| Vitamin D$_2$ supp. (4,000,000 units/lb.) | grams | 92 |
| Calcium pantothenate (32 grams/lb.) | do | 84 |
| Niacin Supp. (50%) | do | 16 |
| Zinc oxide | do | 57 |
| Monosodium glutamate | | |

[1] Calcium Carbonate Company trace mineral salt having a guaranteed analysis of:

Percent
- Manganese, minimum _____ 12.20
- Iron, minimum _____ 9.60
- Calcium, maximum _____ 9.50
- Calcium, minimum _____ 7.50
- Copper, minimum _____ 0.73
- Zinc, minimum _____ 0.67
- Iodine, minimum _____ 0.38
- Cobalt, minimum _____ 0.26

[2] By-21 is Commercial Solvents Corporation riboflavin feed supplement containing 8 milligrams of riboflavin per gram of supplement.
[3] PROFERM 6 is Commercial Solvents Corporation feed supplement containing 6 milligrams of vitamin B$_{12}$ per pound of supplement.
[4] BACIFERM PB 10 is Commercial Solvents Corporation feed supplement additive containing 7.5 grams of bacitracin per pound and 2.5 grams of procaine penicillin per pound.

Five Hampshire pigs weighing an average of 50.0 pounds per pig were started on a 45-day test being fed the feed composition described above. One crippled pig was removed from testing on the fifth day of the test period.

The average final weight per pig was 99.8 pounds, the average daily gain was 1.11 pounds, the average daily amount of feed consumed was 3.89 pounds, and the feed conversion was 352.2 pounds of feed for each 100 pounds in weight gain.

*Example VIII*

The procedure of Example VII was carried out except that the test period was 41 days, 10 pounds of monosodium glutamate were added to the feed composition, and the ground yellow corn of the feed composition was reduced from 1,502.0 pounds to 1,492.0 pounds. Five Hampshire pigs were used for this test having an average initial weight of 48.3 pounds. The average final weight of the pigs was 99.6 pounds, the average daily gain was 1.25 pounds per pig, and the average daily feed consumed was 3.92 pounds per pig. The feed conversion was 313.3 pounds of feed for every 100 pounds of weight gained.

*Example IX*

The procedure of Example VII was carried out except that 20 pounds of monosodium glutamate were added to the feed compositon and the ground corn portion of the feed was reduced from 1,502.0 pounds to 1,482.0 pounds. Five Hampshire pigs were used in this test having an average initial weight of 47.5 pounds per pig. After 45 days on this test the pigs had an average final weight of 99.6 pounds per pig. The average daily gain was 1.16 pounds per pig and the average daily feed consumed was 3.66 pounds per pig,. The feed conversion was 316.2 pounds of feed per 100 pounds of weight gained.

*Example X*

The procedure of Example VII was carried out except that the length of the test was 35 days and seven Duroc pigs having an average initial weight of 51.9 pounds per pig were tested. The average final weight per pig after the 35 day test was 101.7 pounds for an average daily gain of 1.42 pounds per pig and an average daily feed consumption of 4.27 pounds per pig. The feed conversion was 299.6 pounds of feed per 100 pounds of weight gained.

*Example XI*

The procedure of Example VII was carried out except that the length of the test was 32 days with seven Duroc pigs having an average initial weight of 52.5 pounds per pig. The feed composition was identical to the one described in Example VIII. The average final weight per pig after 32 days of testing was 101.1 pounds for an average daily gain of 1.52 pounds per pig with an average daily feed consumption of 4.38 pounds per pig. The feed conversion was 288.0 pounds of feed per 100 pounds of weight gained.

*Example XII*

The procedure of Example VII was carried out except that the length of the test was 34 days utilizing seven Duroc pigs having an average initial weight of 52.1 pounds per pig. The feed compositon utilized in this test was identical to the one in Example IX. After 34 days of testing, the average final weight per pig was 102.0 pounds for an average daily gain of 1.47 pounds per pig with an average daily intake of 4.31 pounds of feed. The feed conversion was 294.1 pounds of feed per 100 pounds of weight gained.

*Example XIII*

A procedure similar to the ones described above was used for testing pigs on feeds containing 0.05% and 0.1% monosodium glutamate. Twelve pigs were fed in each treatment group. The average daily weight gain per pig in the control test utilizing no monosodium glutamate was 1.61 pounds per pig per day. Pigs fed on identical feeds except for the addition of 0.05% monosodium glutamate gained at the rate of 1.70 pounds per pig per day while pigs being fed the control ration plus 0.1% monosodium glutamate gained at the rate of 1.85 pounds per pig per day.

*Example XIV*

The procedure of Example XIII was carried out with a similar feed composition. Twelve pigs were fed in each treatment group. The average daily weight gain per pig eating the control feed containing no monosodium glutamate was 1.67 pounds per pig per day. When 0.05% monosodium glutamate was added to the control feed, the average daily weight gain was 1.73 pounds per pig per day, while pigs eating the control feed plus 0.10% monosodium glutamate gained at the rate of 1.71 pounds per pig per day.

Now having described our invention, what we claim is:

1. A process for improving the feed conversion of swine which comprises feeding said swine a nutrient ration containing a small but effective amount to produce improved feed conversion of monosodium glutamate.

2. A process for increasing the rate of growth of swine which comprises feeding said swine a nutrient ration containing from about 0.01 to about 5% by weight of monosodium glutamate.

3. The process of claim 2 wherein the amount of monosodium glutamate ranges from about 0.05 to about 1% by weight.

4. A method of improving the preferability of baby pig starter feeds containing sugar in an amount of up to about 25% by weight which comprises adding an effective amount of monosodium glutamate to a nutrient baby pig starter feed to increase the preferability thereof.

5. The method of claim 4 wherein the starter feed ration contains from about 0.01 to 5% by weight monosodium glutamate.

6. The method of claim 4 wherein the starter feed ration contains 0.1 to 1% by weight monosodium glutamate.

References Cited

UNITED STATES PATENTS

| | | | |
|---|---|---|---|
| Re. 24,707 | 9/1959 | Gillis | 99—2 |
| 2,819,301 | 1/1958 | Monson | 99—2 |
| 3,009,859 | 11/1961 | Laborit et al. | 99—2 |
| 3,060,086 | 10/1962 | Kueter | 99—2 |

OTHER REFERENCES

Seiden et al.: Handbook of Feedstuffs, p. 210, Springer Pub. Co., New York, N.Y., 1957.

A. LOUIS MONACELL, *Primary Examiner.*

D. DONOVAN, *Assistant Examiner.*